US012762495B1

(12) United States Patent
Haslam et al.

(10) Patent No.: US 12,762,495 B1
(45) Date of Patent: Oct. 13, 2026

(54) SCORING OPERATIONAL MAPPINGS FOR AN ORGANIZATION

(71) Applicant: Morgan Stanley Services Group Inc., New York, NY (US)

(72) Inventors: Andrew Haslam, London (GB); Charisma Buxton-Tetteh, London (GB); James Boustead, New York, NY (US)

(73) Assignee: Morgan Stanley Services Group Inc., New York, NY (US)

(*) Notice: Subject to any disclaimer, the term of this patent is extended or adjusted under 35 U.S.C. 154(b) by 0 days.

(21) Appl. No.: 18/807,673

(22) Filed: Aug. 16, 2024

(51) Int. Cl.
*G06Q 10/00* (2026.01)
*G06Q 10/0637* (2023.01)

(52) U.S. Cl.
CPC ................................ *G06Q 10/0637* (2013.01)

(58) Field of Classification Search
None
See application file for complete search history.

(56) References Cited

U.S. PATENT DOCUMENTS 10,956,790 B1 3/2021 Victoroff et al.
2006/0242194 A1 10/2006 Tsyganskiy et al.
2008/0288306 A1* 11/2008 MacIntyre ............. G06Q 30/02 705/7.29
2012/0166623 A1 6/2012 Suit
2012/0167094 A1 6/2012 Suit
2014/0314311 A1* 10/2014 Garera ................ G06F 16/9537 382/159
2015/0269245 A1* 9/2015 Schmidtler ....... G06F 16/24578 707/748
2017/0075984 A1* 3/2017 Deshpande ......... G06F 16/9535
2019/0286999 A1* 9/2019 Chalabi ................... G06F 16/36
2019/0332369 A1* 10/2019 Gupta ....................... G06F 8/60
2019/0356539 A1 11/2019 Soon-Shiong et al.
2020/0228414 A1* 7/2020 Garty ..................... H04L 43/045
2021/0083945 A1* 3/2021 Bitterfeld ............ H04L 41/0866
2022/0214937 A1* 7/2022 Vutukuru ............ G06F 11/0787
2022/0318231 A1 10/2022 Franz
2023/0229639 A1* 7/2023 McCreary ................ G06N 3/09 707/756
2024/0257012 A1* 8/2024 Todd .................. G06Q 10/0637
2025/0028321 A1* 1/2025 Sigurdsson ............. G10L 13/08

OTHER PUBLICATIONS

Mao, Huina, Mapping near-real-time power outages from social media, Sep. 19, 2018, International Journal of Digital Earth, https://www.tandfonline.com/doi/epdf/10.1080/17538947.2018.1535000?needAccess=true, p. 1-15. (Year: 2018).*

* cited by examiner

*Primary Examiner* — Joseph M Waesco
(74) *Attorney, Agent, or Firm* — K&L Gates LLP

(57) ABSTRACT

A method and system for training a confidence score algorithm to evaluate relationships of data elements in data element pairs of an operational mapping. A classification server performs an initial training process with declared operational mappings and assigns qualitative classifications for each operational mapping. The classification server sends the assigns qualitative classifications to an administrator system as part of a supervised training feedback loop.

18 Claims, 11 Drawing Sheets

602

604

| Classification | Octant |
| --- | --- |
| Strongly assert | (+,+,+) |
| Assert | (+,+,-), (+,-,+) and (-,+,+) |
| Oppose | (+,-,-), (-,-,+) and (-,+,-) |
| Strongly oppose | (-,-,-) |

SCORING OPERATIONAL MAPPINGS FOR AN ORGANIZATION

BACKGROUND

Organizations often have different operational functions spread across various locations and computer systems. Mapping operational processes creates a foundation for organizational performance improvements. It creates a common language and understanding for team members and workers, and it helps identify processes needing improvement as well as the critical performance measures.

SUMMARY

In one general aspect, the present invention is directed to computer-implemented systems and methods for classifying operational mappings of an organization. The classified operational mappings can be used to identify alternative system configurations to prevent an entire business process from going offline and establishing a business continuity plan for the organization. According to various implementations, a method according to the present invention comprises the step of receiving, by a classification server, a current operational mapping for the organization. Then the classification server can extract a plurality of data element pairs from the operational mapping, where each of the plurality of data element pairs comprise a first data element, a second data element, and a linking element, where the first and second data elements are different data element types. Based on the data element pairs, the classification server can generate a confidence score for each of the data element pairs. Then the classification server can aggregate the confidence scores into a multi-dimensional coordinate set and determine a qualitative classification for the operational mapping based on a corresponding sub-space for the multi-dimensional coordinate set in a multi-dimensional space. In that connection, the multi-dimensional coordinate set can correspond to a coordinate in the sub-space of the multi-dimensional space. The method can also comprise the step of transmitting, by the classification server, the qualitative classification and the operational mapping to a system administrator for evaluation of the qualitative classification by the system administrator as part of a feedback evaluation for the classification server. These and other benefits that can be realized through embodiments of the present invention will be apparent from the description that follows.

FIGURES

Various embodiments of the present invention are described herein by way of example in conjunction with the following figures.

FIGS. 4A-4D show logic flow diagrams for decomposing a first operational mapping 410 and a second operational mapping 420 by the classification server 302, according to at least one aspect of the present invention.

Figure 5:
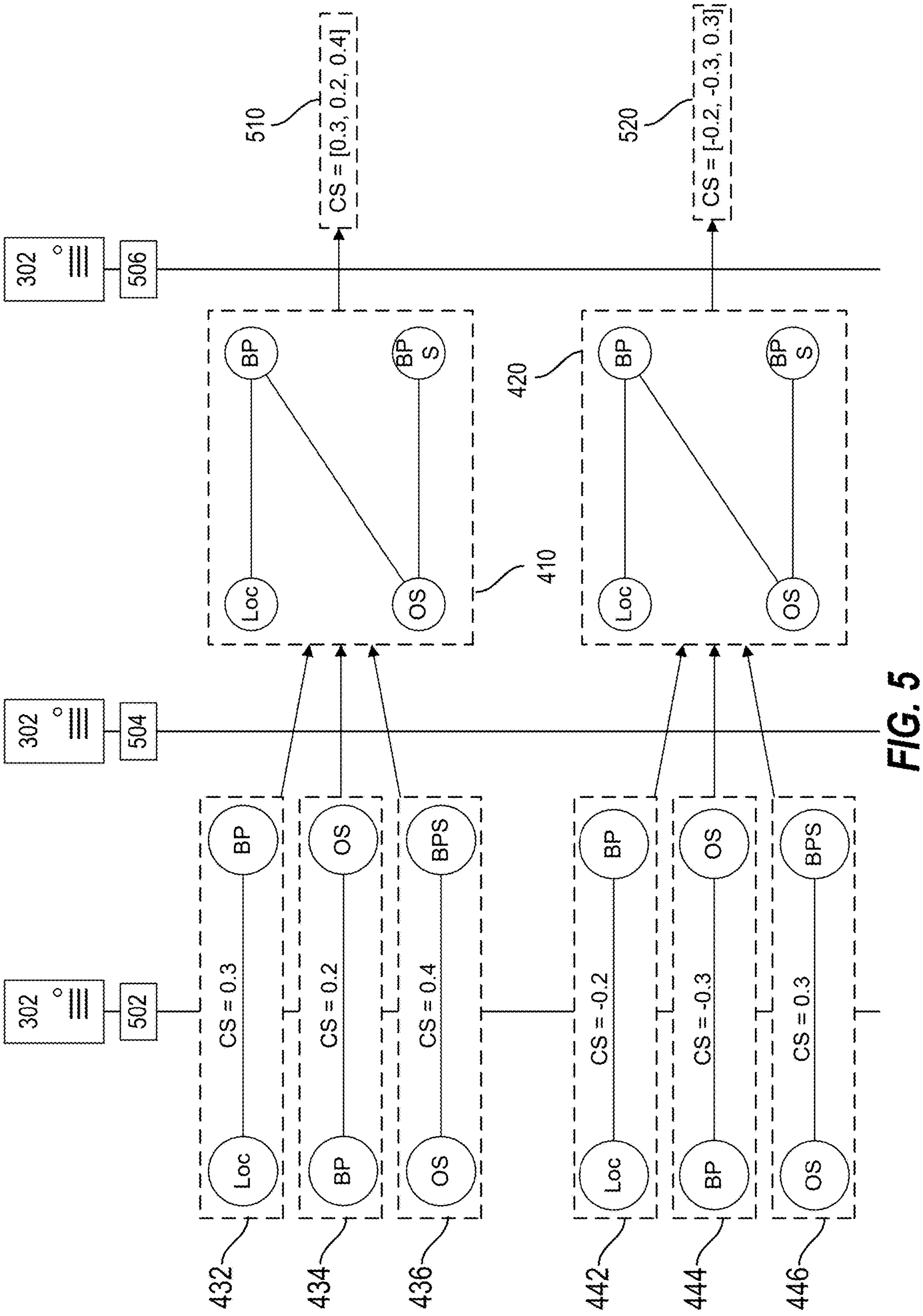

FIG. 5 shows a classification server configured to determine a confidence score for an exemplary first operational mapping 410 and second operational mapping 420, according to at least one aspect of the present invention.

Figure 6:
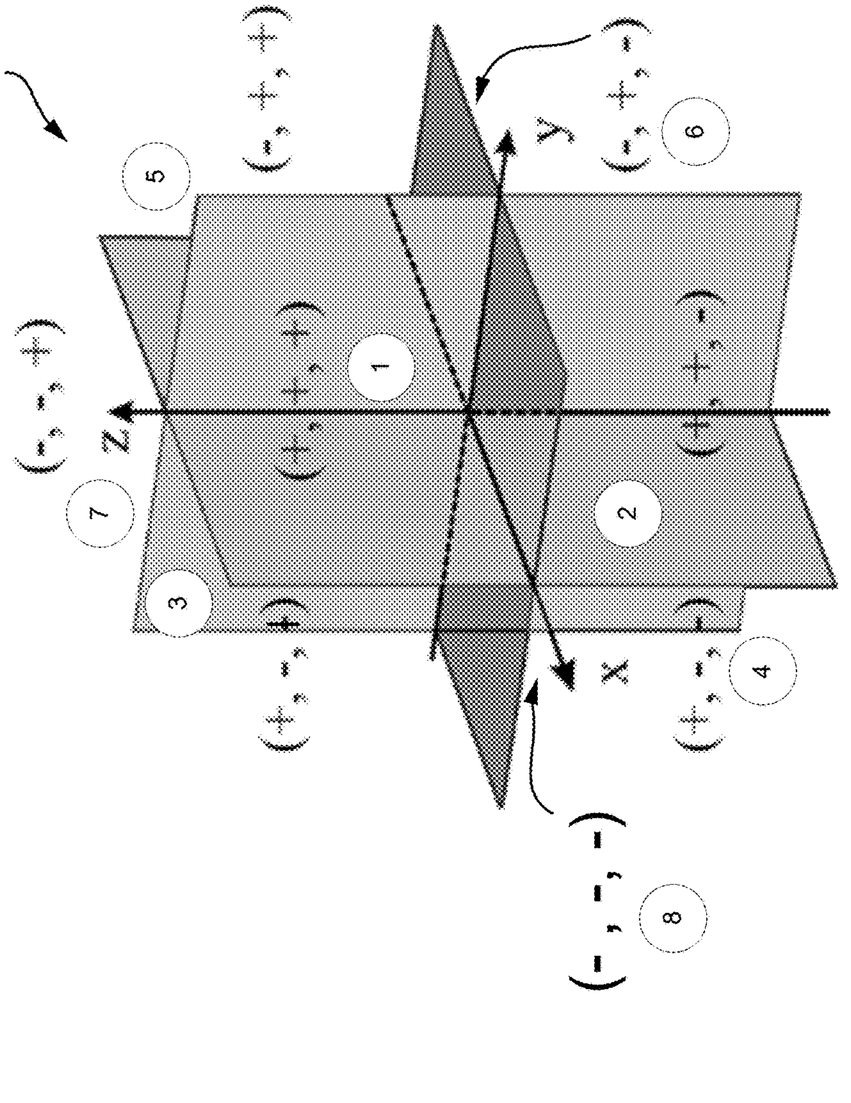

FIG. 6 shows a method for assigning a qualitative classification for an exemplary first operational mapping 410 and second operational mapping 420 by a classification server 302, according to at least one aspect of the present invention.

Figure 7:
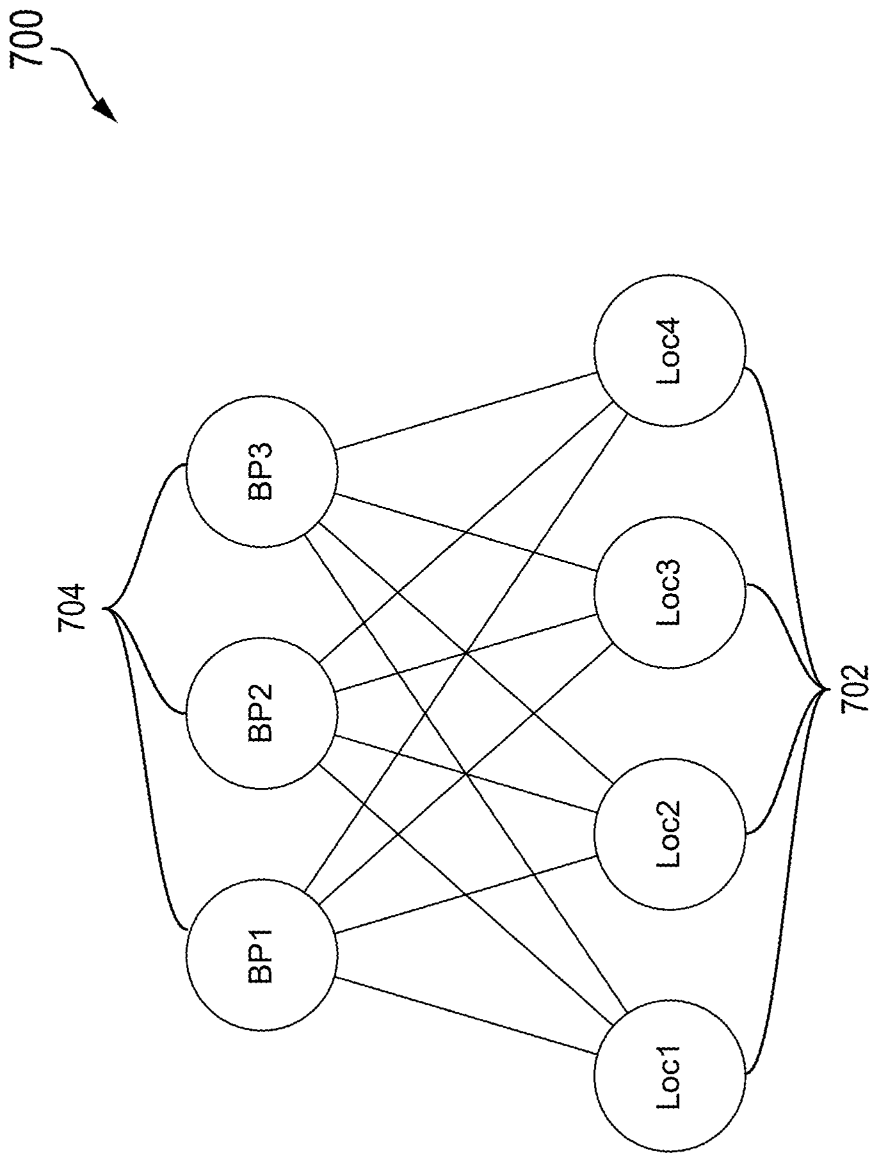

FIG. 7 shows an exemplary perceptron 700 comprising four location identifier data elements 702 wired to three business process data elements 704, according to at least one aspect of the present invention.

Figure 8:
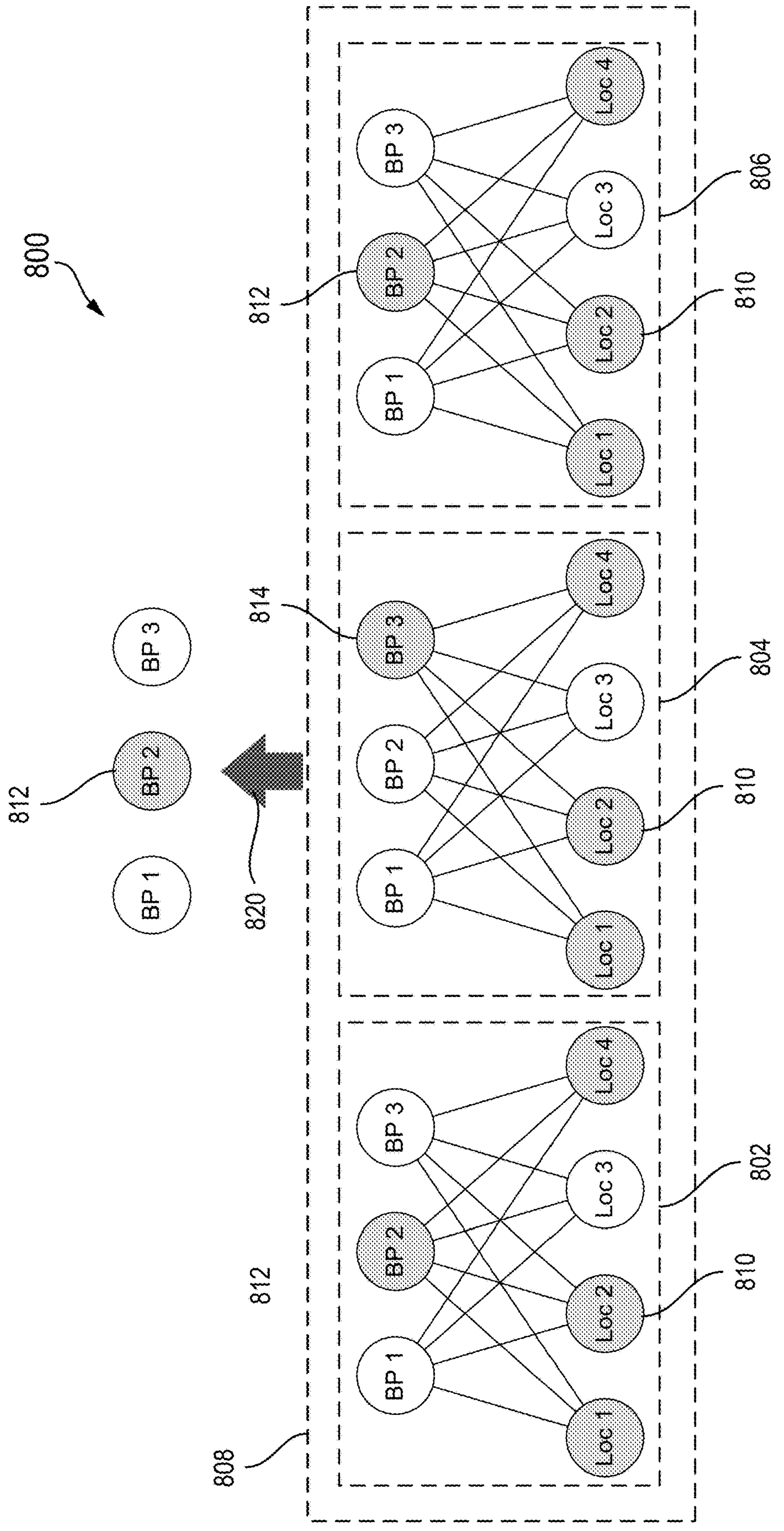

FIG. 8 shows a committee machine 808 comprising a first perceptron 802, a second perceptron 804, and a third perceptron 806, according to at least one aspect of the present invention.

Figure 9:
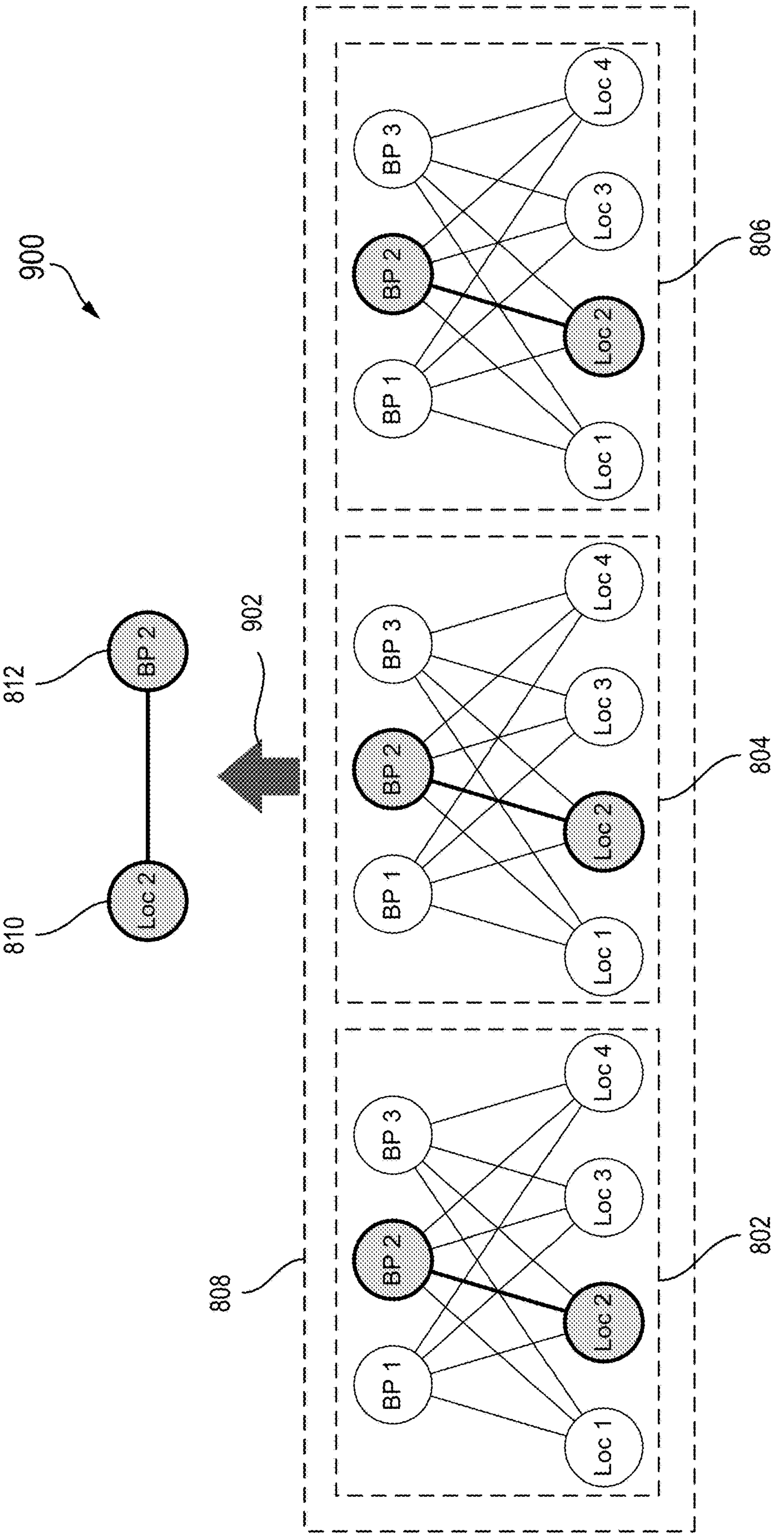

FIG. 9 shows a method 900 for assigning a confidence score 904 to a linking relationship between data element Loc2 810 and data element BP2 812, according to at least one aspect of the present invention.

Figure 10:
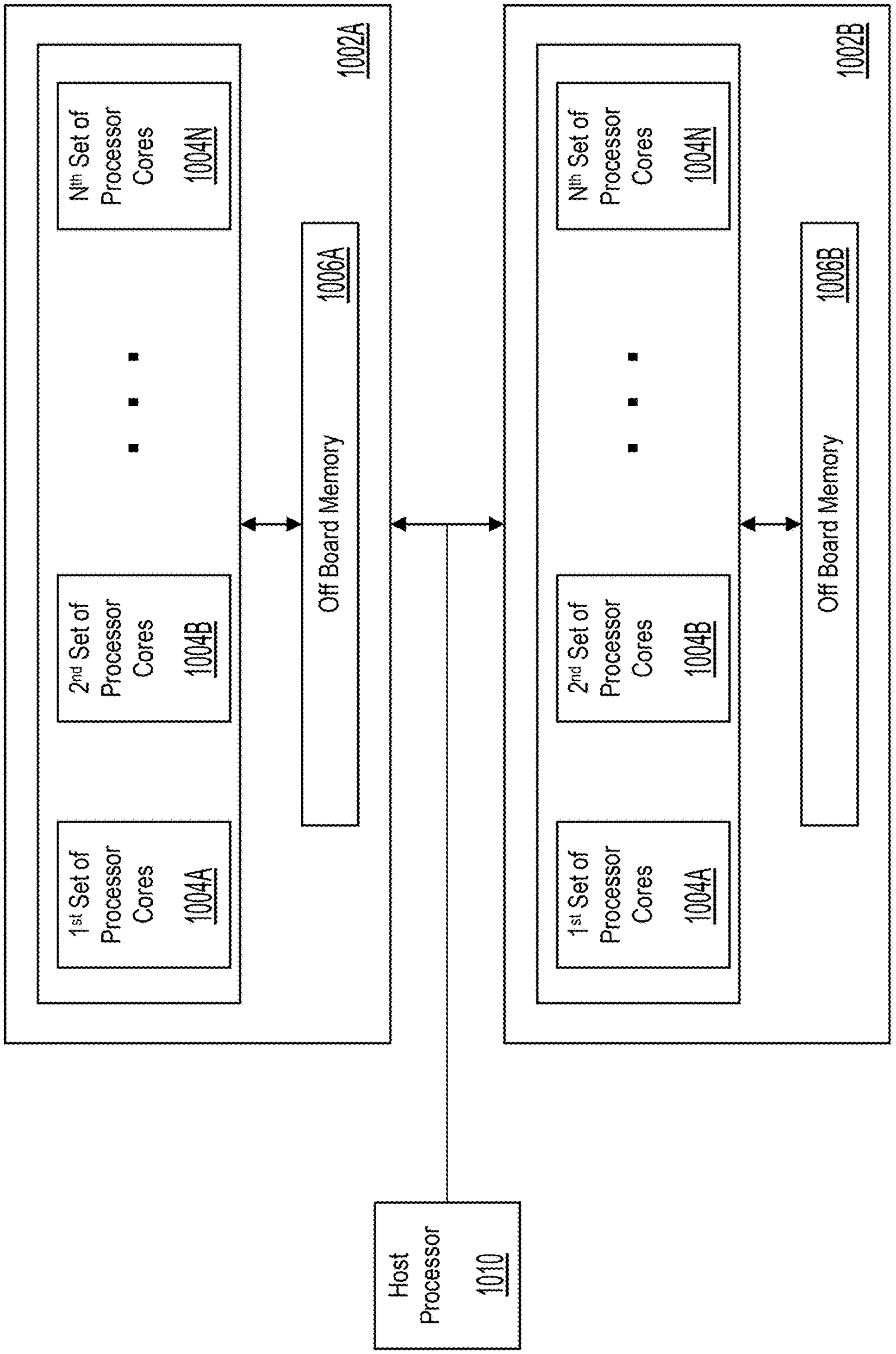

FIG. 10 is a diagram of a computer system 1000 that could be used to implement the embodiments described above, such as the processes described above in connections with FIGS. 1-9.

Figure 11:
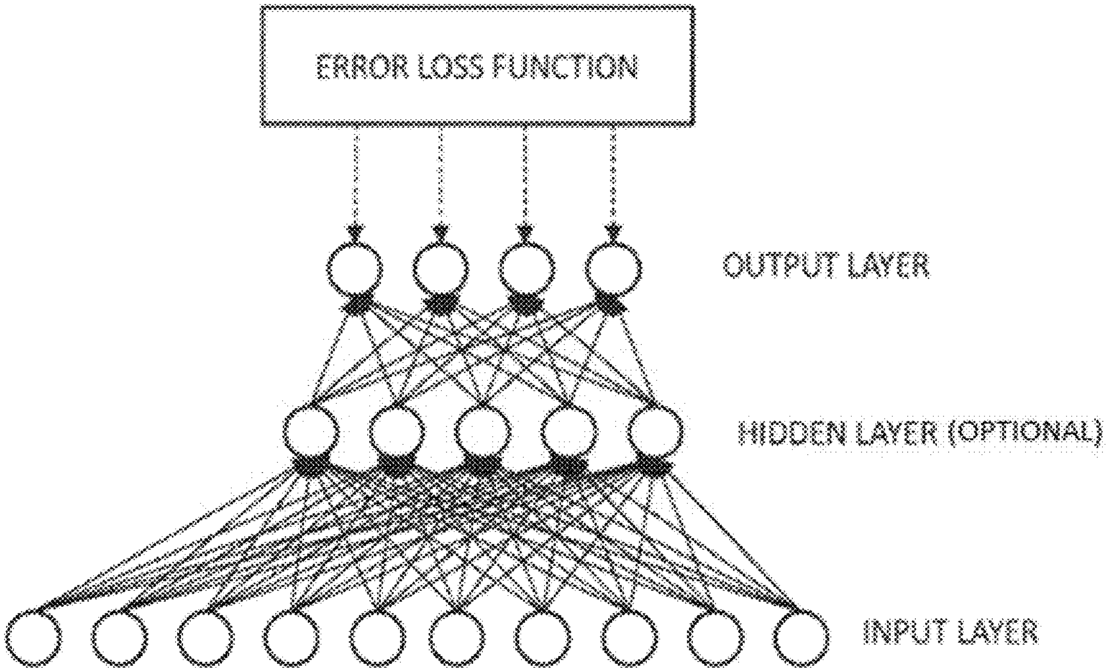

FIG. 11 is an example neural network trained via gradient descent or stochastic gradient descent, such as the processes described above in connections with FIGS. 1-9.

DESCRIPTION

The present disclosure provides, in various embodiments, an agnostic classification system for assessing the confidence score of a plurality of operational mappings for an enterprise. The classification system may receive a plurality of operational mappings for the enterprise that may be generated through a declared method or a discovered method. Operational mappings may be used for a variety of business applications of the enterprise, including business continuity plans (BKP), recovery resolution planning (RRP), as well as mapping important business services (IBS) and key business services (KBS) to vulnerabilities for resilience assessments.

In one example, regulatory agencies may require certain companies to implement business continuity plans to mitigate the consequences of cyber-attacks and natural disasters. The operational mappings may identify affected business services or business processes based on their location, supported business processes, or support organizations. Once the business service is identified, the operational mappings may be used to assess the vulnerability and potential consequence of the service going offline. Accordingly, the operational mappings can be used to help identify alternative system configurations to prevent an entire business process from going offline and establishing a business continuity plan.

Figure 1:
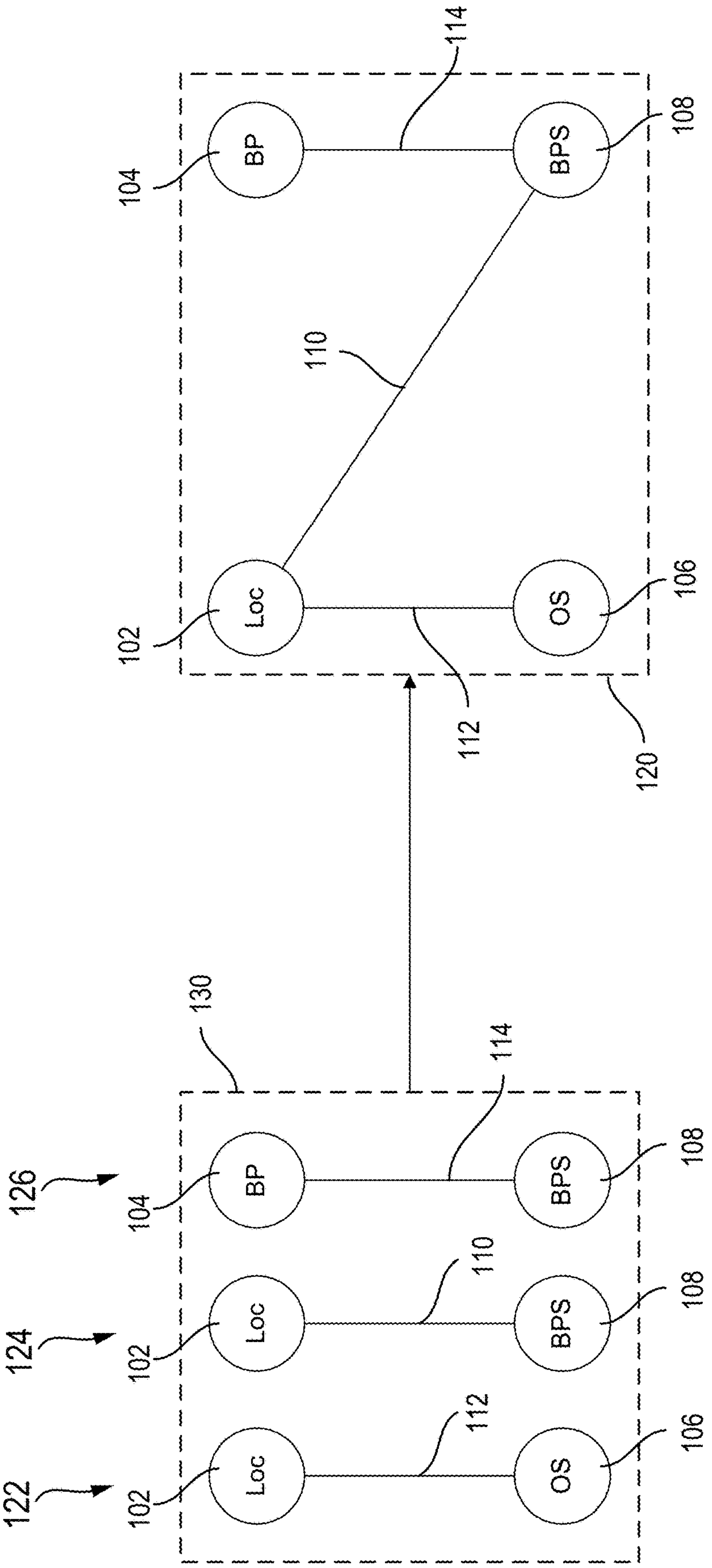
FIG. 1 shows an operational mapping 120 comprising four data elements, where there is one data element for each of four data element types, according to at least one aspect of the present invention.

FIG. 1 shows an operational mapping 120 comprising four data elements, where there is one data element for each of four data element types, according to at least one aspect of the present invention. In various aspects, the data element types comprise a location identifier data element 102, a business process data element 104, an organization supported data element 106, and a business process supported data element 108. The operational mapping 120 is generated from three data elements pairs 130 comprising a first data element pair 122, a second data element pair 124, and a third data element pair 126. Each data element pair comprises two different data elements and a linking element 110, 112, 114 that indicates the relationship between the two different data elements. For example, the linking elements 110, 112, 114 may indicate that the top data element type "supports" or "does" the function of a second, bottom data element type.

In one example, the first data element pair 122 comprises a location identifier 102 connected by a first linking element 112 to organization supported 106; a second data element pair 124 comprises the location identifier 102 connected by a second linking element 110 to a business process supported 108; and a third data element pair 126 comprises the business process 104 connected by a third linking element 114 to the business process supported 108. In order to generating an operational mapping, the three data element pairs 130 must have a second data element pair 124 that shares a data element type with the first data element pair 122 and a different data element type with the third data element pair 126. Even though there is no connection between the organization supported 106 and the business process 104, the second data element pair 124 is able to establish a connection between the two data elements to generate the operation mapping 120.

Figure 2:
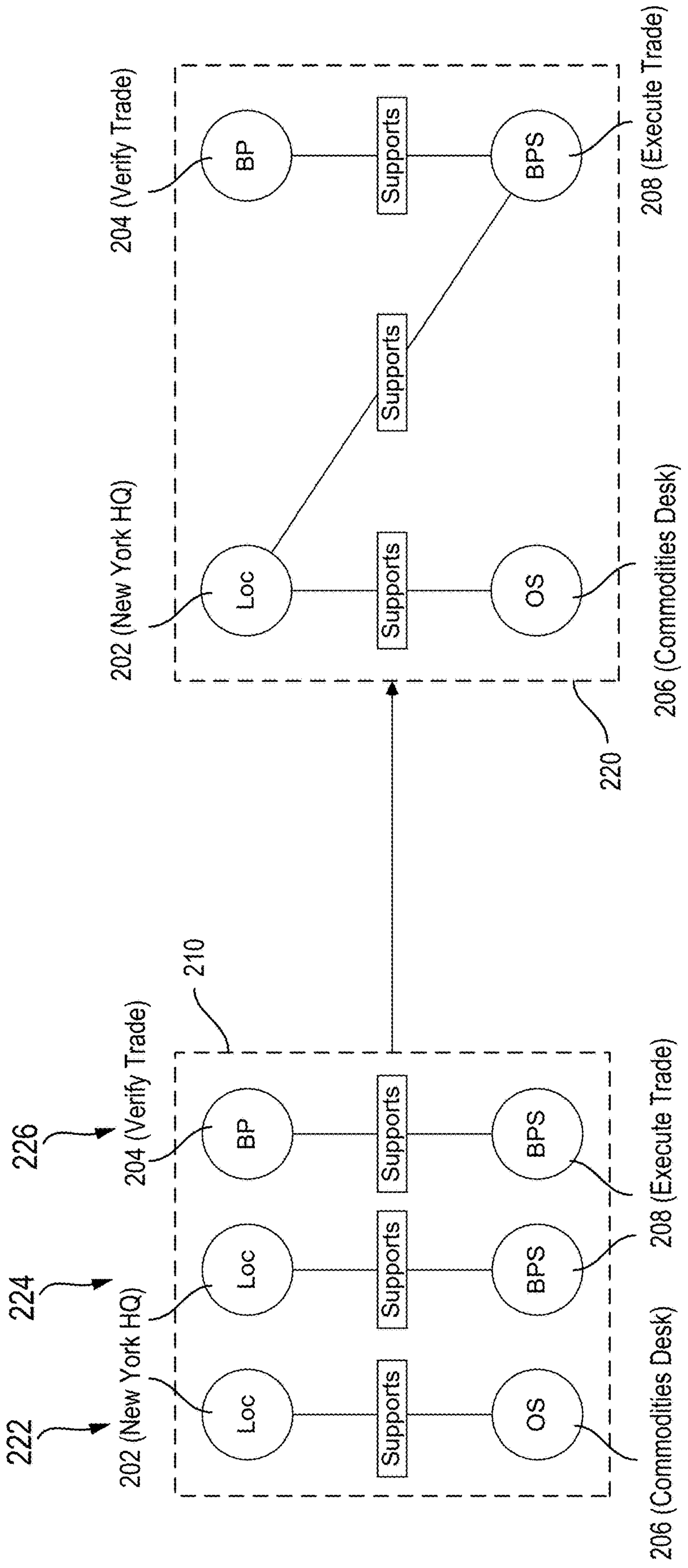
FIG. 2 shows an exemplary operational mapping 220 generated from three data element pairs 210, according to at least one aspect of the present invention.

FIG. 2 shows an exemplary operational mapping 220 generated from three data element pairs 210, according to at least one aspect of the present invention. The operational mapping 220 comprises four data elements, with one for each of four data element types (e.g., location identifier 202, business process 204, organization supported 206, and business process supported 208). The three data element pairs 220 comprise the first data element pair 222, the second data element pair 224, and the third data element pair 226, and establish a connection between each of the four data element types. The exemplary operational mapping 220 provides an example mapping, particular for a financial organization that trades securities, that shows the location identifier is the New York headquarters and supports the commodities desk as the organization supported 206 and also supports the execution of trades as the business process supported 208. Additionally, the exemplary operational mapping 220 provides an example connection between the business process supported 208 to execute trades and the business process 204 that verifies trades.

In various aspects, the operational mappings 220 may be generated by either a manual declaration process or a discovery process by a discovery server. In a manual declaration process, a subject matter expert manually identifies the linking relationships between a plurality of different data elements for the organization to create the operational mapping. In the discovery process, a discovery server receives data from a plurality of data sources of the organization and identifies data element pairs based on a discovery algorithm that correlates data elements. In one example, the discovery server may generate a plurality of data element pairs 222-226 and connect the plurality of data element pairs 222-226 to create a discovered operational mapping 220.

Figure 3:
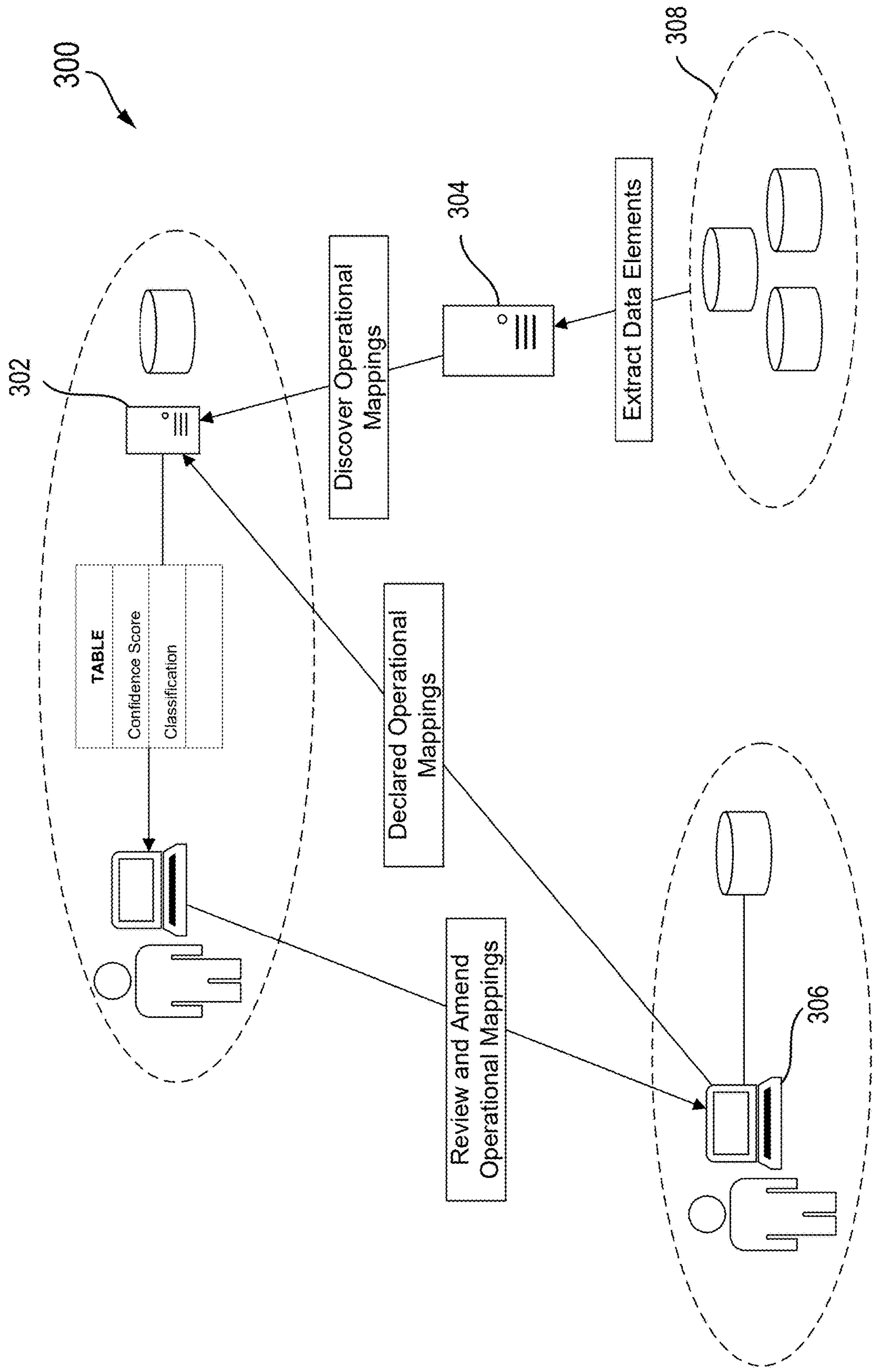
FIG. 3 shows logic flow diagram of an operational mapping classification system 300, according to at least one aspect of the present invention.

FIG. 3 shows a logic flow diagram of an operational mapping classification system 300, according to at least one aspect of the present disclosure. The operational mapping classification system 300 comprises a classification server 302, a discovery server 304, an administrator system 306, and a plurality of data sources 308 (e.g., entitlement databases). The operational mapping classification system 300 continuously trains a confidence score algorithm, at the classification server 302, in a supervised training environment. The administrator system 306 initiates the classification process by transmitting an initial training dataset to the classification server 302. The initial training dataset comprises declared operation mappings that are used to establish the baseline weights for the confidence score algorithm.

In various aspects, the operational mapping classification system 300 can be used to identify outliers in declared operational mappings. The declared operational mappings may be reevaluated with the trained confidence score algorithm. In one example, any declared operational mapping that is not classified as a strong assert is sent to a system administrator 306 for review. The system administrator 306 assists in the supervised training with a binary check of the classification. The system administrator 306 may be provided the opportunity to verify all classifications and may receive a confidence score, qualitative classification, data element pair, and/or the operational mapping associated with a classification. The system administrator 306 may ignore the classification and take no action, modify the classification, add a new classification, or remove an existing classification. Any changes are sent back to the classification server 302 to retain the confidence score algorithm.

The confidence score algorithm is used to evaluate the linking relationship between data elements in data element pairs, such as the example data element pairs 222, 224, 226 of FIG. 2. Each of the three data element pairs 210 in the operational mapping 220 can be assigned a confidence score that can correspond to a Cartesian coordinate with as many coordinates as data element pairs (e.g., [X, Y, Z] for three data element pairs). The Cartesian coordinate (e.g., −0.2, −0.3, 0.3) corresponds to an octant of a three-dimensional space (e.g., −, −, +), such as shown in FIG. 6, that can be used to generate a qualitative classification (e.g., oppose) for the operational mapping 220. Once the operational mapping is classified by the classification server 302, it is sent to the administrator system 306 to review and amend the classification if necessary. In one example, the amended classification comprises a binary approval that indicates that the administrator system 306 agrees or disagrees with the generated classification. Once the administrator system 306 reviews and/or amends the classification, the amended classification is sent back to the classification server 302 so that it can be used to update weighting values for the confidence score algorithm as part of the supervised training.

Once the confidence score algorithm undergoes an initial training process or a predetermined number of epochs, the confidence score algorithm may be used to evaluate potential operational mappings that are discovered by the discovery server 304. In various embodiments, the classification server 302 receives potential operational mappings from the discovery server 304, decomposes the potential operational mappings, assigns confidence scores to the data element pairs, determines a qualitative classification (e.g., strongly assert, assert, oppose, strongly oppose), and sends the qualitative classification to the administrator system 306 for further review.

The discovery server 304 can receive data elements from a plurality of data sources including entitlement database or a data collection system that anonymously monitors email traffic of the organization. In one example, the discovery server 304 is in communication with an entitlement database, such as described in U.S. Pat. No. 7,870,156, which is incorporated by reference herein. The entitlement database can specify, for example, the permissions that employees of the organization have based on the roles of the employees. For example, based on their roles, some employees might only be able to read data from a database; other employees might be able to change data in a database; other employees may be permitted to take certain actions (e.g., execute trades, verify trades, issues payments, etc.).

In addition to or as an alternative to entitlement databases, the discovery server 304 may discover potential mappings from specific email traffic that is received by users in a specific location to perform a specific business process. This email traffic may be anonymized and stored in a database. Accordingly, the discovery server 304 can identify relationships between different data element types and generates data element pairs from the email traffic. Once the discovery server 304 generates three discovered data element pairs, the discovery server 304 combines them to create a discovered operational mapping and sends the discovered operational mapping to the classification server 302 for verification.

Figure 4B:
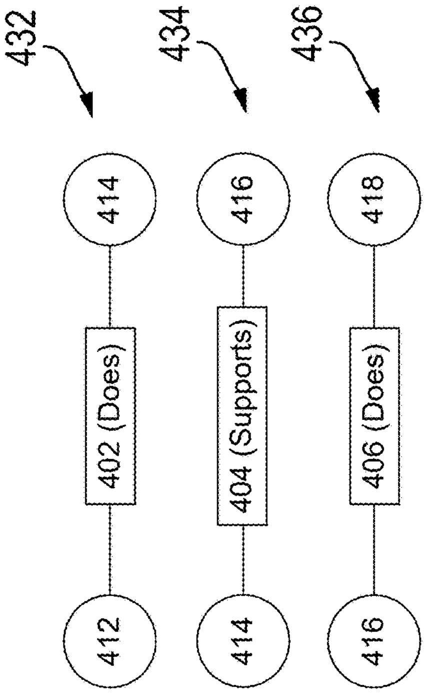
Figure 4D:
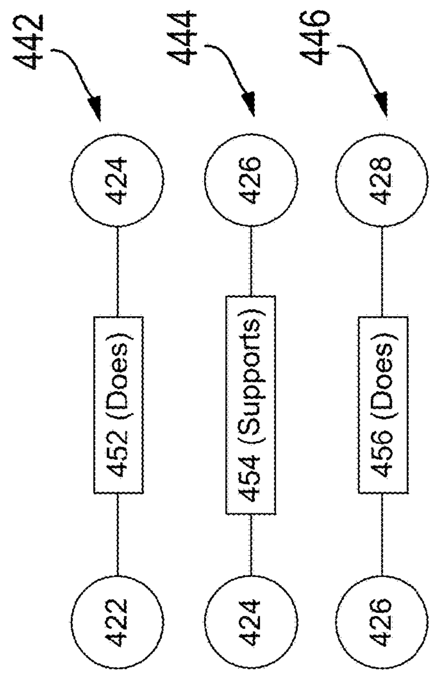
Figure 4A:
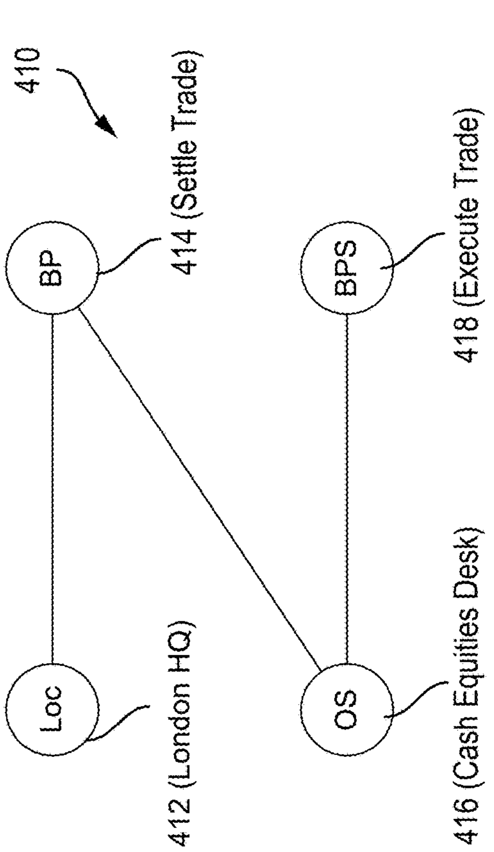
Figure 4C:
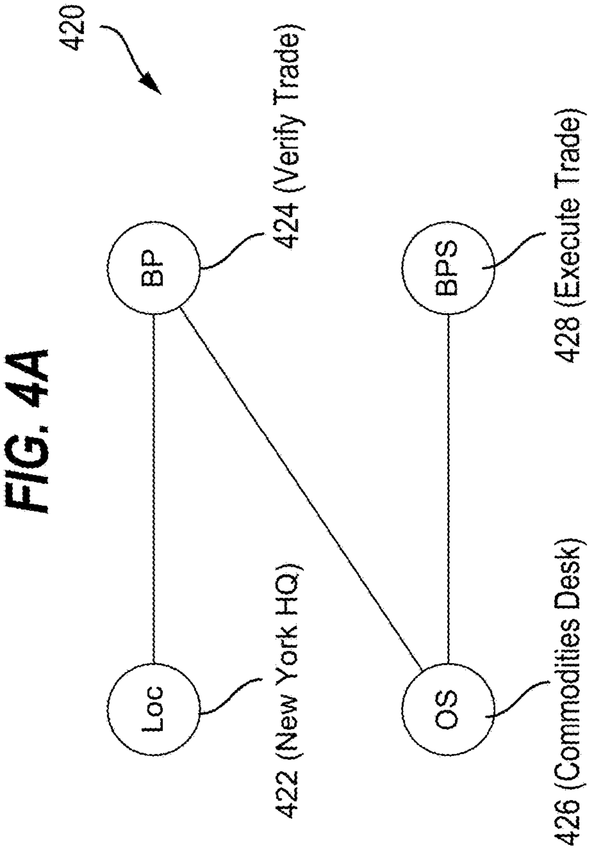

FIGS. 4A-D shows a logic flow diagram for decomposing a first operational mapping 410 (FIG. 4A) and a second operational mapping 420 (FIG. 4C) by the classification server 302, according to at least one aspect of the present invention. As shown in FIG. 3, the classification server 302 can receive the first operational mapping 410 and the second operation mapping 420 for classification. The classification server 302 can perform the same evaluation process regardless of whether the operational mapping is generated by the discovery server 302 or a manually declared operational mapping. As discussed, the classification server 302 preferably decomposes each data element pair in the operational mappings 410, 420 in order to calculate a confidence score by the confidence algorithm. The first operational mapping 410 can be separated, as shown in FIG. 4B, into a first data element pair 432, a second data element pair 434, and a third data element pair 436. The second operational mapping 430 can be similarly separated, as shown in FIG. 4C, into a fourth data element pair 442, fifth data element pair 444, and sixth data element pair 446. Once the first and second operational mappings 410, 420 are decomposed into the plurality of data element pairs, the classification server 302 can calculate the confidence scores for each data element pair.

FIG. 5 shows a classification server 302 configured to determine a confidence score for the exemplary first operational mapping 410 and second operational mapping 420, according to at least one aspect of the present invention. In this example, the classification server 302 calculates at step 502 a confidence score (denoted "CS") for each of the first data element pair 432, the second data element pair 434, the third data element pair 436, the fourth data element pair 442, the fifth data element pair 444, and the sixth data element pair 446. The classification server 302 can employ the trained confidence algorithm to calculate the confidence score for each data element pair. In various embodiments, the confidence algorithm evaluates the relationship between the two data elements that create the data element pair and normalizes the values as a decimal between 0.5 and −0.5. In this example, the classification server 302 determines at step 504 the operational mapping that corresponds to three of the data element pairs so that the three confidence scores can be associated with the operational mappings 410, 420. The classification server can then aggregate, at step 506, the confidence score for the first, second, and third data element pairs 432, 434, 436 into a first set of Cartesian coordinates 510, and the fourth, fifth, and sixth data element pairs 432, 434, 436 into a second set of Cartesian coordinates 520.

FIG. 6 shows a method for assigning a qualitative classification for the exemplary first and second operational mappings 410, 420 by the classification server 302, according to at least one aspect of the present invention. As shown in the example of FIG. 5, the classification server determines that confidence score vector for the first operational mapping is [0.3, 0.2, 0.4] and that the confidence score vector for the second operational mapping is [−0.2, −0.3, 0.3]. The first confidence score vector corresponds to the octant of the 3D-Cartesian space shown in FIG. 6 where the x, y, and z values are positive, i.e., octant 1 in FIG. 6. The second confidence score vector corresponds to the octant of the 3D-Cartesian space shown in FIG. 6 where the x and y values are negative and the z value is positive, i.e., octant 7 in FIG. 6. The classification server 302 can assign a classification to each operational mapping based on its corresponding octant, such as according to the qualitative classification table 604 shown in FIG. 6, that maps each of the octants to a corresponding operational mapping classification. For example, the vector for the first operational mapping 410 map to a coordinate in the (+, +, +) octant (octant 1), and therefore the first operational mapping 410 can be assigned a "strong assert" qualitative classification according to table 604. The vector for the second operational mapping 420 corresponds to a coordinate in the (−, −, +) octant (octant 7), and therefore the second operational mapping 420 can be assigned an "oppose" qualitative classification according to the example table 604.

As shown in example table 604, operational mapping vectors in octant 1 can be assigned the "strongly assert" classification. Operational mapping vectors in octants 2, 3 and 5 can be assigned an "assert" classification (i.e., an assertion that is not as strong as "strongly assert"). Operational mapping vectors in octants 4, 7 and 6 can be assigned an "oppose" classification. And operational mapping vectors in octant 8 can be assigned a "strongly oppose" classification (i.e., an opposition that is stronger than a mere "oppose" classification). Of course, in other embodiments different mappings between octants and classifications can be used.

As previously discussed in FIG. 3, once the qualitative classification is determined for the operational mapping, the classification server 302 sends the qualitative classifications and the underlying operational mapping to the administrator system 306 for a supervised review. Any changed made by the administrative system 306 may be used to update the classification weightings for of the confidence score algorithm.

FIGS. 7-9 show a method for training a confidence score algorithm through an ensemble of perceptrons or multi-layer neural networks according to various embodiments of the present invention. FIG. 7 shows an exemplary perceptron 700 comprising four location identifier data elements 702 with connections to three business process data elements 704, according to at least one aspect of the present invention. The classification server 302 can utilize a plurality of perceptrons or a multi-layer neural network(s) that is trained, through machine learning, to calculate a confidence score (e.g., confidence algorithm) between two data elements in a data element pair, of a different data element type. The confidence score can be determined based on an ensemble of weak learners. The perceptrons can only learn linearly separable classifications, making them weak learners. However, a committee machine can combine the weak leaning perceptrons that collectively learn non-linearly separable classifications. The multi-layer neural network(s) may comprise an input layer, an output layer, and one or more hidden layers therebetween, and may be trained via stochastic gradient descent or gradient descent, for example.

FIG. 8 shows a committee (or ensemble) machine 808 comprising a first perceptron 802, a second perceptron 804, and a third perceptron 806, according to at least one aspect of the present invention. The classification server 302 can creates the committee machine 808 by randomly initializing a perceptron's weights and training the perceptrons to classify the data elements based on a binary classification between different element data types. The classification server 302 can initialize the second perceptron 804 to train the second perceptron 804 in the same way as the first perceptron 802. The committee machine 808 continues to initialize and train perceptrons until the plurality of perceptrons 802-806 collectively vote 820 for the correct classification between data elements. The shaded data elements show the classification vote for each perceptron. A correct classification may be determined based on a majority vote of the committee machine 808. In the example of FIG. 8, the committee machine 808 initializes and trains the first perceptron 802, second perceptron 804, and third perceptron 806, and compares the classification vote from each perceptron for a business process data elements and location data elements. The first perceptron 802 and the third perceptron 806 identify data element BP2 as the data element with that correctly correlates (e.g., "does") to Loc1, Loc2, Loc4 whereas second perceptron 804 identifies data element BP3 as correlating to Loc1, Loc2, Loc4. The committee machine 808 can determine that data element BP2 and data elements Loc1, Loc2, Loc4 are correctly classified based on the ⅔ majority to vote 820 from the perceptrons. The voting process can continue until the perceptrons of the committee machine correctly vote on the binary classification of all location data elements and business process data elements.

FIG. 9 shows a method 900 for assigning a confidence score 902 to a linking relationship between data element Loc2 and data element BP2, according to at least one aspect of the present invention. As showing in FIG. 8, the committee machines determine a correct classification for the data element Loc2 and the data element BP2 based on a majority vote. Then each perceptron 802, 804, 806, generates a weighted confidence score between the data element Loc2 and the data element BP2. The committee machine 808 sums the weighted confidence scores and normalizes the values over a range of range of −0.5 to 0.5 and generates a single confidence score 902. This is an example of how the confidence scores in FIG. 5 can be computed for the data element pairs; which can then be used to create a vector for an operational mapping as shown in FIG. 5; which mapping can then be classified based on the vector as shown in FIG. 6.

In various applications of the present invention, the operational mappings may facilitate steps of a business continuity plan, set permissions for entitlement databases, and ensure compliance with regulatory procedures. In one example, the business continuity plan protects an organizations' assets by facilitating the safety of employees and enable operational resilience. In another examples, the operational mappings may dictate permissions, access, and resource availability in an entitlement database. The entitlement database may be a part of a centralized system that defines access permissions and action privileges for users in the organization. In another example, regulatory compliance is maintained by evaluating current actions and procedures by an organization against applicable laws, regulations, policies, procedures, standards, or other rules issues by government bodies and regulatory bodies. An operational mapping may ensure that the organization meets a minimum compliance level according to a mapped regulation or policy. Accordingly, the operational mappings may be used to detect deficiencies in a policy an automatically resolve the deficiency according to a minimum compliance level.

Once the classification server 302 generates the operational mappings, the operational mappings may be stored at the classification storage repository and accessible by user in the organization. In various embodiments, the user may generate a business continuity plan based on identified relationships in the organizational mappings. For example, an operational mapping may identify a business process as business service and the organization may be required by a regulatory agency to implement system redundancies to mitigate the consequences of a cyber-attack or natural disaster. Further, the operational mappings may be used predict the organization's exposure in the event that the business service goes offline. If the exposure level is greater than a predetermined threshold, the organization may be required to implement immediate action to maintain compliance with standards or agencies.

FIG. 10 is a diagram of a computer system 1000 that could be used to implement the embodiments described above, such as the processes described above in connections with FIGS. 1-9. The illustrated computer system 1000 comprises multiple processor units 1002A-B that each comprises, in the illustrated embodiment, multiple (N) sets of processor cores 1004A-N. Each processor unit 1002A-B may comprise on-board memory (ROM or RAM) (not shown) and off-board memory 1006A. The on-board memory may comprise primary, volatile and/or non-volatile, storage (e.g., storage directly accessible by the processor cores 1004A-N). The off-board memory 1006A-B may comprise secondary, non-volatile storage (e.g., storage that is not directly accessible by the processor cores 1004A-N), such as ROM, HDDs, SSD, flash, etc. The processor cores 1004A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a co-processor in a device with a host CPU 1010 as well. An AI accelerator typically has tens of thousands of matrix multiplier units that operate at lower precision than a CPU core, such as 8-bit precision in an AI accelerator versus 64-bit precision in a CPU core.

In various embodiments, the different processor cores 1004 may train and/or implement different networks or subnetworks or components. For example, in one embodiment, the cores of the first processor unit 1002A may implement some of the small networks in block 932 and the second processor unit 1002B may implement others of the small networks in block 932. As another example, another multiple processor unit 1002C may implement an external machine learning system that is a subsystem for the operational mapping classification system 300 of FIG. 3. In some embodiments, operational mapping classification system 300 may be a form of machine learning system other than a neural network. Further, different sets of cores in the first and/or second processor unit 1002A, 1002B may be responsible for different subnetworks 802, 804, 806 or different ensemble members. One or more host processors 1010 may coordinate and control the processor units 1002A-B. The process depicted in various figures can be embodied as a set of instructions stored within a memory (e.g., an integral memory of the processing units 1002A, 1002B or an off board memory 1006A couple to the processing units 1002A, 1002B or other processing units) coupled to one or more processors (e.g., at least one of the sets of processor cores 1004A-N of the processing units 1002A, 1002B or another processor(s) communicatively coupled to the processing units 1002A, 1002B), such that, when executed by the one or more processors, the instructions cause the processors to perform the aforementioned process by, for example, controlling the committee machine 808 or the different subnetworks 802, 804 stored in the processing units 1002A, 1002B.

In other embodiments, the computer system 1000 could be implemented with one processor unit. In embodiments where there are multiple processor units, the processor units could be co-located or distributed. For example, the processor units may be interconnected by data networks, such as a LAN, WAN, the Internet, etc., using suitable wired and/or wireless data communication links. Data may be shared between the various processing units using suitable data links, such as data buses (preferably high-speed data buses) or network links (e.g., Ethernet).

The software for the various computer systems described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, CUDA® (CUDA), Fortran, JAVA® (Java), Lisp, Pascal, Object Pascal, Haskell, ML; and examples of scripting languages include Bourne script, JAVASCRIPT®, PYTHON®, Ruby, LAU® (Lua), PHP, and PERL® (Perl).

A neural network, such as shown in FIG. 11, is typically trained via gradient descent or stochastic gradient descent. In both, learned parameters are updated in an iterative manner to minimize and error function. Training a neural network by gradient descent involves adjusting the networks parameters to minimize a chosen loss function. Then, the output of the neural network is compared to the actual target values using a loss function, which measures the network's performance. Common loss functions include mean squared error or cross-entropy, depending on the problem. After calculating the loss, the network works backward to compute the gradient of the loss function with respect to each parameter in the network. This is done using the chain rule to calculate how much each parameter contributed to the overall error. This process involves computing partial derivatives through the network. The chain rule allows for the calculation of how much each parameter affects the final error. Derivatives indicate the rate of change of a function concerning its variables. In this case, they show how much the loss function changes concerning small changes in the network's parameters. These derivatives are fundamental in guiding the updates made to the parameters during the gradient descent process. By adjusting parameters in the direction opposite to the gradient, the network aims to minimize the loss, thus improving its performance. With the gradients known, the network parameters can be updated in the opposite direction of the gradient to minimize the loss function. This step involves multiplying the gradients by a learning rate (a hyperparameters that controls the size of the update) and subtracting this from the current parameter values. These steps can be repeated for multiple epochs or iterations until the network converges to a state where the loss is minimized, or until a stopping criterion is met.

While with gradient descent, all of the training samples in the training set are run through to do a single update for a parameter in a particular iteration, with stochastic gradient descent, on the other hand, only one or a subset of training sample are used from the training set to do the update for a parameter in a particular iteration. If a subset is used, it is called "Minibatch Stochastic gradient Descent." Thus, if the number of training samples are very large, then using gradient descent may take too long because in every iteration when you are updating the values of the parameters, you are running through the complete training set. On the other hand, using stochastic gradient descent will be faster because one training sample is used and it starts improving itself right away from the first sample. Stochastic gradient descent often converges much faster compared to gradient descent but the error function is not as well minimized as in the case of gradient descent.

In one general aspect, therefore, the present invention is directed to computer systems and computer-implemented methods for: receiving, by a classification server, an operational mapping for the organization; extracting, by the classification server, a plurality of data element pairs from the operational mapping, wherein each of the plurality of data element pairs comprise a first data element, a second data element, and a linking element, wherein the first data element and the second data element are different data element types; generating, by the classification server, a plurality of confidence scores, wherein each confidence score of the plurality of confidence scores corresponds to a data element pair of the plurality of data element pairs; aggregating, by the classification server, the plurality of confidence scores into a multi-dimensional coordinate set; determining, by the classification server, a qualitative classification for the operational mapping based on a corresponding sub-space for the multi-dimensional coordinate set in a multi-dimensional space, wherein the multi-dimensional coordinate set corresponds to a coordinate in the sub-space of the multi-dimensional space; and transmitting, by the classification server, the qualitative classification and the operational mapping to a system administrator for evaluation of the qualitative classification by the system administrator as part of a feedback evaluation for the classification server.

The method may further describe wherein the multi-dimensional coordinate set comprises three dimensions that correspond to a first octant of a plurality of octants in the multi-dimensional space; and wherein the classification server comprises a look-up table with a plurality of qualitative classifications corresponding to the plurality of octants of in the multi-dimensional space. Alternatively, the method may further describe wherein the operational mapping comprises four data element types; and wherein the four data element types comprise a location identifier, a business process, an organization supported, and a business process supported. The method may further describe any one of the following: wherein the confidence score is a decimal value between 0.5 and −0.5; wherein the operational mapping is a discovered operational mapping generated by a discovery server; wherein the operational mapping is a declared operational mapping received from the system administrator; wherein the operational mapping is generated from three different data element pairs; or wherein the three different data element pairs comprise a first data element pair, a second data element pair, and a third data element pair, and wherein: the first data element pair and the second data element pair share the first data element; the second data element pair and the third data element pair share the second data element; and the first data element pair and the third data element pair do not share a common data element.

The method may further describe wherein the linking element comprises a relationship indicator between the first data element and the second data element, wherein the relationship indicator comprises: supports and does.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A method for classifying operational mappings for an organization, the method comprising:

receiving, by a classification server, an operational mapping for the organization;

extracting, by the classification server, a plurality of data element pairs from the operational mapping, wherein each of the plurality of data element pairs comprise a first data element, a second data element, and a linking element, wherein the first data element and the second data element are different data element types;

generating, by the classification server, a plurality of confidence scores based on a confidence score algorithm comprising a committee machine, wherein the committee machine comprises a plurality of perceptrons in which each of the plurality of perceptrons are trained to classify data elements based on a binary classification between different data types, wherein the committee machine classifies each data element pair of the plurality of data element pairs based on a majority vote of the plurality of perceptrons, wherein each confidence score of the plurality of confidence scores corresponds to a data element pair of the plurality of data element pairs, wherein each confidence score of the plurality of confidence scores is generated by summing weighted confidence scores from the plurality of perceptrons and normalizing the summed weighted confidence scores over a range of −0.5 to 0.5, and wherein the confidence score algorithm is trained on declared operation mappings;

converting, by the classification server, the plurality of confidence scores into a multi-dimensional coordinate set;

determining, by the classification server, a qualitative classification for the operational mapping based on a corresponding sub-space for the multi-dimensional coordinate set in a multi-dimensional space, wherein the multi-dimensional coordinate set corresponds to a first coordinate in the corresponding sub-space of the multi-dimensional space;

transmitting, by the classification server, the qualitative classification and the operational mapping to a system administrator for evaluation of the qualitative classification by the system administrator as part of a feedback evaluation for the confidence score algorithm, wherein the confidence score algorithm is retrained based on the feedback evaluation;

automatically generating, by the classification server, based on the qualitative classification, a reconfiguration instruction set that specifies an alternative system configuration to prevent a business process of the organization from going offline; and transmitting, by the classification server, the reconfiguration instruction set to the system administrator for implementation of the alternative system configuration.

2. The method of claim 1, wherein the multi-dimensional coordinate set comprises three dimensions that correspond to a first octant of a plurality of octants in the multi-dimensional space.

3. The method of claim 2, wherein the classification server comprises a look-up table with a plurality of qualitative classifications corresponding to the plurality of octants of in the multi-dimensional space.

4. The method of claim 1, wherein the operational mapping comprises four data element types.

5. The method of claim 4, wherein the four data element types comprise a location identifier, the business process, a supported organization, and a supported business process.

6. The method of claim 1, wherein the operational mapping is a discovered operational mapping generated by a discovery server.

7. The method of claim 1, wherein the operational mapping is a declared operational mapping received from the system administrator.

8. The method of claim 1, wherein the operational mapping is generated from three different data element pairs.

9. The method of claim 8, wherein the three different data element pairs comprise a first data element pair, a second data element pair, and a third data element pair, and wherein:

the first data element pair and the second data element pair share the first data element;

the second data element pair and the third data element pair share the second data element; and the first data element pair and the third data element pair do not share a common data element.

10. The method of claim 8, wherein the linking element comprises a relationship indicator between the first data element and the second data element, wherein the relationship indicator comprises: supports and does.

11. A system for classifying operational mappings for an organization, the system comprises:

a classification server;

a discovery server in communication with the classification server via a data network, wherein the classification server comprises:

a processor; and a memory in communication with the processor, wherein the memory stores computer executable instructions that when executed by the processor, causes the processor to:

receive an operational mapping for the organization;

extract a plurality of data element pairs from the operational mapping, wherein each of the plurality of data element pairs comprise a first data element, a second data element, and a linking element, wherein the first data element and the second data element are different data element types;

generate a plurality of confidence scores based on a confidence score algorithm comprising a committee machine, wherein the committee machine comprises a plurality of perceptrons in which each of the plurality of perceptrons are trained to classify data elements based on a binary classification between different data types, wherein the committee machine classifies each data element pair of the plurality of data element pairs based on a majority vote of the plurality of perceptrons, wherein each confidence score of the plurality of confidence scores corresponds to a data element pair of the plurality of data element pairs, wherein each confidence score of the plurality of confidence scores is generated by summing weighted confidence scores from the plurality of perceptrons and normalizing the summed weighted confidence scores over a range of −0.5 to 0.5, and wherein the confidence score algorithm is trained on declared operation mappings;

convert the plurality of confidence scores into a multi-dimensional coordinate set;

determine a qualitative classification for the operational mapping based on a corresponding sub-space for the multi-dimensional coordinate set in a multi-dimensional space, wherein the multi-dimensional coordinate set corresponds to a first coordinate in the corresponding sub-space of the multi-dimensional space;

transmit the qualitative classification and the operational mapping to a system administrator for evaluation of the qualitative classification by the system administrator as part of a feedback evaluation for the confidence score algorithm, wherein the confidence score algorithm is retrained based on the feedback evaluation;

automatically generate, based on the qualitative classification, a reconfiguration instruction set that specifies an alternative system configuration to prevent a business process of the organization from going offline; and transmit the reconfiguration instruction set to the system administrator for implementation of the alternative system configuration.

12. The system of claim 11, wherein the multi-dimensional coordinate set comprises three dimensions that correspond to a first octant of a plurality of octants in the multi-dimensional space.

13. The system of claim 11, wherein the discovery server is in communication with an entitlement database.

14. The system of claim 13, wherein the operational mapping is a discovered operational mapping generated by the discovery server from the entitlement database.

15. The system of claim 11, wherein the operational mapping comprises four data element types.

16. The system of claim 15, wherein the four data element types comprise a location identifier, the business process, a supported organization, and a supported business process.

17. The system of claim 11, wherein the operational mapping is generated from three different data element pairs.

18. The system of claim 17, wherein the three different data element pairs comprise a first data element pair, a second data element pair, and a third data element pair, and wherein:

the first data element pair and the second data element pair share the first data element;

the second data element pair and the third data element pair share the second data element; and the first data element pair and the third data element pair do not share a common data element.

* * * * *